US005497275A

United States Patent [19]
Perry et al.

[11] Patent Number: 5,497,275
[45] Date of Patent: Mar. 5, 1996

[54] POWER PACK FOR AN AUTOMOTIVE EXTERIOR MIRROR ASSEMBLY

[75] Inventors: William M. Perry, Palestine; Kerry L. Helmer, Hollansburg, both of Ohio

[73] Assignee: United Technologies Automotive, Inc., Dearborn, Mich.

[21] Appl. No.: 450,852

[22] Filed: May 25, 1995

Related U.S. Application Data

[60] Continuation of Ser. No. 317,720, Oct. 4, 1994, which is a division of Ser. No. 60,268, May 12, 1993, Pat. No. 5,363,246.

[51] Int. Cl.⁶ ........................................... B60R 1/06
[52] U.S. Cl. ..................... 359/873; 359/874; 359/877; 248/481
[58] Field of Search ........................ 359/843, 872, 359/873, 874, 876, 877; 248/478, 479, 481, 483

[56] References Cited

U.S. PATENT DOCUMENTS

| | | | |
|---|---|---|---|
| 1,526,226 | 2/1925 | Hodny | 248/481 |
| 2,555,239 | 5/1951 | Morgenstern | 403/123 |
| 2,710,734 | 6/1955 | Haberstump | 248/481 |
| 3,552,836 | 1/1969 | Oskam | 359/876 |
| 4,080,049 | 3/1978 | Oskam et al. | 359/876 |
| 4,101,206 | 7/1978 | Oskam et al. | 359/876 |
| 4,114,988 | 9/1978 | Enomoto | 359/874 |
| 4,116,538 | 9/1978 | Oskam | 359/877 |
| 4,158,483 | 6/1979 | Fisher et al. | 359/876 |
| 4,281,899 | 8/1981 | Oskam | 359/876 |
| 4,324,454 | 4/1982 | Kumai | 359/877 |
| 4,403,829 | 9/1983 | Thujiuchi et al. | 359/877 |
| 4,506,954 | 3/1985 | Enomoto | 359/874 |
| 4,555,166 | 11/1985 | Enomoto | 359/874 |
| 4,670,679 | 6/1987 | Koot et al. | 310/99 |
| 4,693,571 | 9/1987 | Kimura et al. | 359/571 |
| 4,696,555 | 9/1987 | Enomoto | 359/874 |
| 4,815,837 | 3/1989 | Kikuchi et al. | 359/874 |
| 4,830,327 | 5/1989 | Fimeri | 248/481 |
| 4,833,376 | 5/1989 | Shimura | 318/286 |
| 4,856,885 | 8/1989 | Fimeri | 359/877 |
| 4,867,408 | 9/1989 | Ozaki | 248/481 |
| 4,877,214 | 10/1989 | Toshiaki et al. | 359/877 |
| 4,881,418 | 11/1989 | Fimeri | 359/877 |
| 4,895,337 | 1/1990 | Oskam et al. | 359/876 |
| 4,930,370 | 6/1990 | Yoshida | 359/873 |
| 4,940,321 | 7/1990 | Yoshida | 359/874 |
| 4,981,279 | 1/1991 | Andreas et al. | 248/483 |
| 5,226,034 | 7/1993 | Nagayama et al. | 359/873 |
| 5,274,505 | 12/1993 | Nagayama et al. | 359/877 |
| 5,311,368 | 5/1994 | Tsuyama | 359/874 |
| 5,343,333 | 8/1994 | Nagayama et al. | 359/874 |

FOREIGN PATENT DOCUMENTS

| | | | |
|---|---|---|---|
| 0269081 | 6/1988 | European Pat. Off. | B60R 1/06 |
| 0276677 | 8/1988 | European Pat. Off. | B60R 1/06 |
| 0278310 | 8/1988 | European Pat. Off. | B60R 1/06 |
| 0352762 | 1/1990 | European Pat. Off. | B60R 1/02 |
| 2119772 | 8/1972 | France | B60R 1/00 |
| 2334535 | 7/1977 | France | B60R 1/06 |
| 2502189 | 7/1976 | Germany | B60R 1/06 |

OTHER PUBLICATIONS

IKU USA, Inc., Brochure "IKU Mirror Actuators–A Move in the Right Direction", (prior to Nov. 1992).
Patent Abstracts of Japan, vol. 10, No. 21, (M–449)(2078) 28 Jan. 1986 of JP, A, 60 179 349 (Koito Se Isakusho K.K.) 13 Sep. 1985.

*Primary Examiner*—Paul M. Dzierzynski
*Assistant Examiner*—John Juba, Jr.
*Attorney, Agent, or Firm*—Harness, Dickey & Pierce

[57] ABSTRACT

The present invention relates to a power pack for an exterior automotive mirror assembly having a central depression in its upper housing whereby a large diameter pivot cup can be used. The drive motors are arranged within the power pack housing such that the central depression partially extends below the top plane of the motors and an overall low profile for the power pack is maintained. The pivot cup, of this power pack, is separate from the mirror casing and is retained by a unique spring retainer.

18 Claims, 4 Drawing Sheets

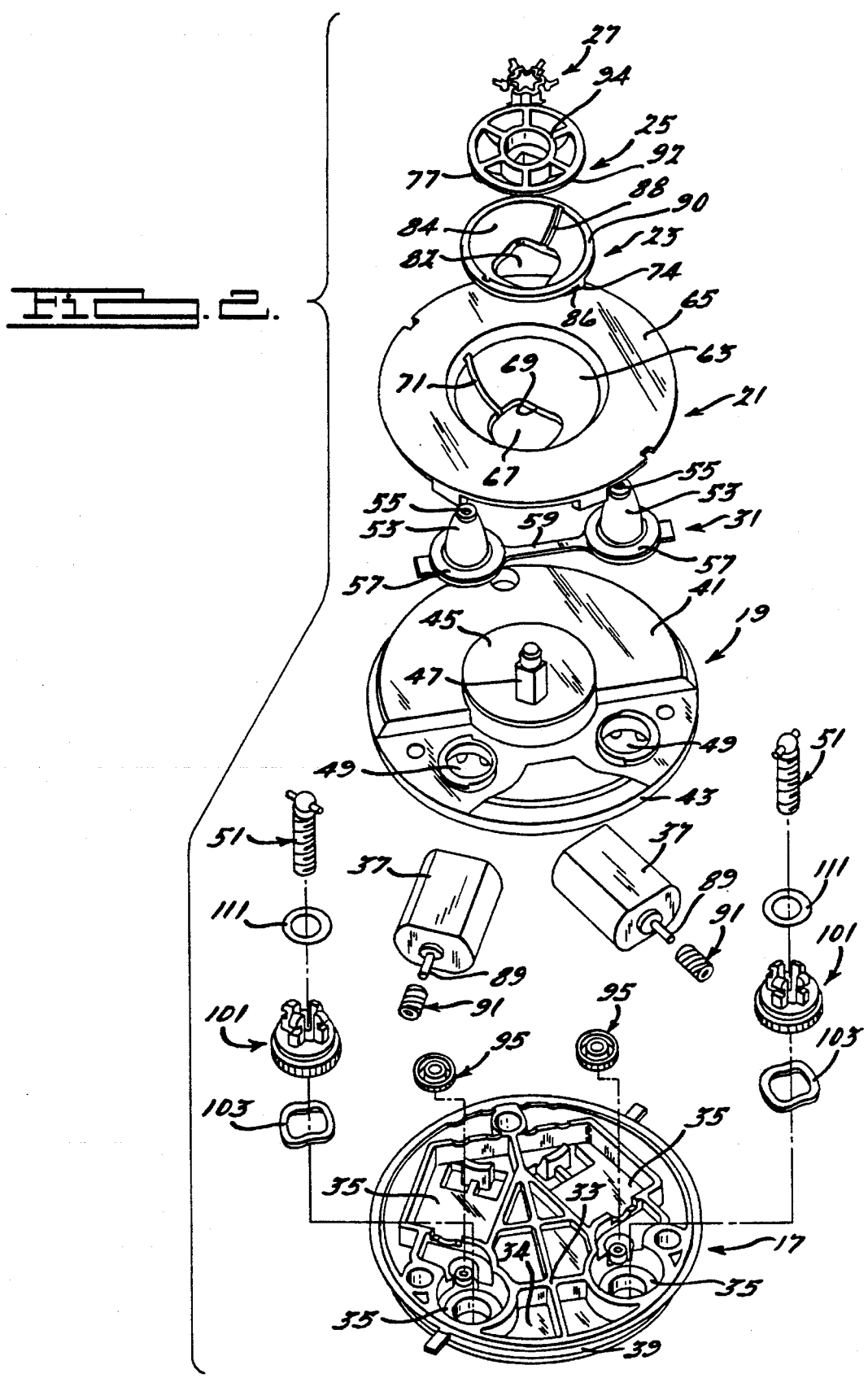

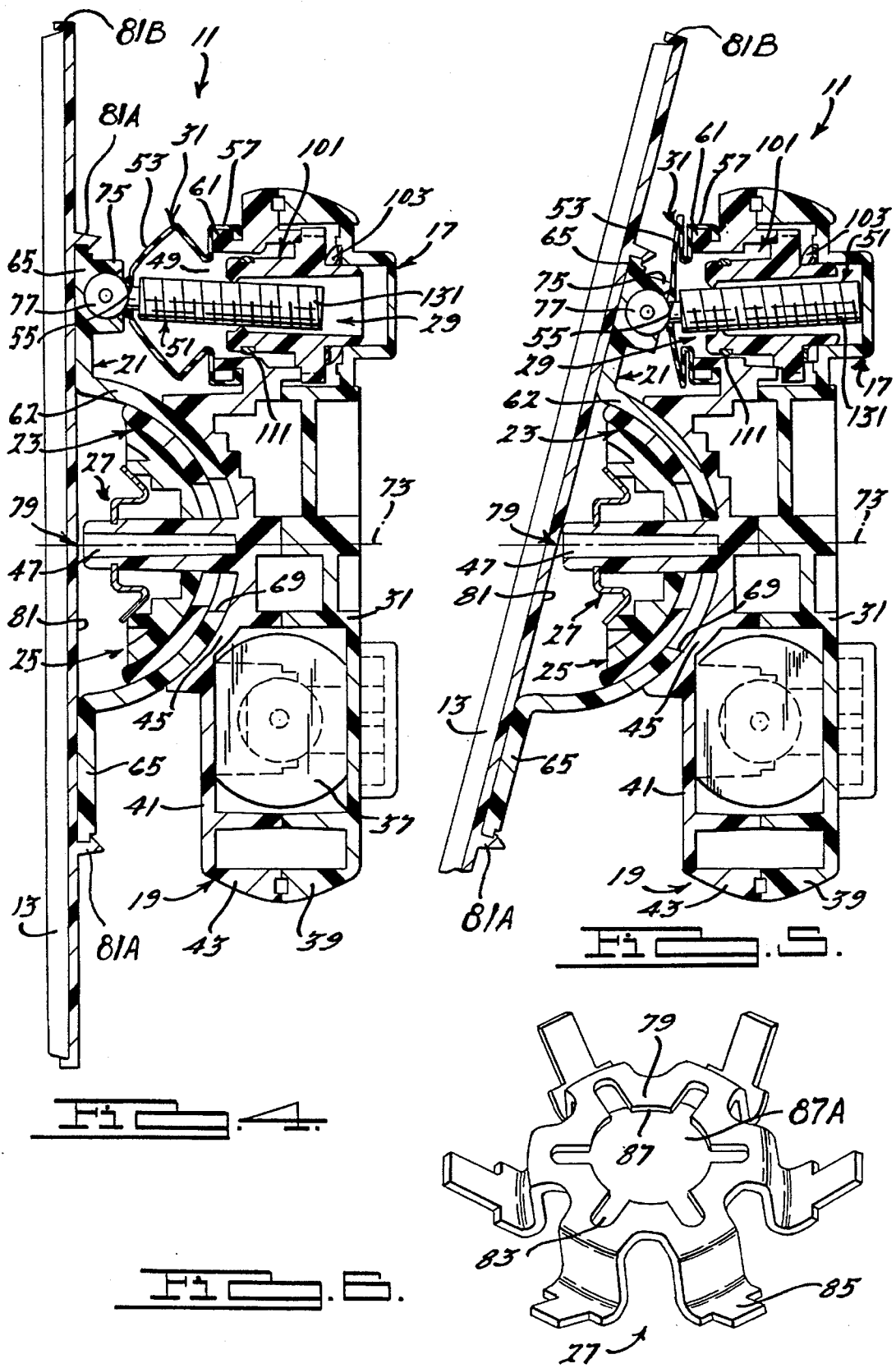

POWER PACK FOR AN AUTOMOTIVE EXTERIOR MIRROR ASSEMBLY

This is a continuation of U.S. patent application Ser. No. 317,720, filed Oct. 4, 1994, which is a division of U.S. patent application Ser. No. 060,268, filed May 12, 1993, U.S. Pat. No. 5,363,246.

BACKGROUND OF THE INVENTION

This invention relates generally to a power pack for an automotive exterior mirror assembly and specifically to an exterior mirror power pack having a large diameter pivot cup.

Glass mirrors used in exterior mirror assemblies for automotive vehicles have become increasingly heavy due to the many added features such as electric heaters and electrochromic dimming units. This weight, when subjected to gravitational forces and the normal vehicle vibration, will create optical distortion of the mirror. This problem is exacerbated further when mirrors are used in combination with motorized power packs. However, vibration problems can be reduced in a number of ways. One such way is to use lighter weight materials. A second method is to use what is known as a "clam shell" power pack housing wherein two outer surfaces are in frictional contact, thereby dampening the mirror from vibration; this is depicted in U.S. Pat. No. 4,281,899 entitled "Adjusting Device For Motor Car Mirrors", issued to Oskam on Aug. 4, 1981, incorporated by reference herewithin. A third method to reduce mirror vibration is by use of a planetary transmission drive unit; this can be observed in U.S. Pat. No. 4,116,538, entitled "Motor-Car Mirror Adjustable About Two Perpendicular Axes", issued to Oskam on Sep. 26, 1978, incorporated by reference herewithin. A fourth method uses a partially spherically shaped pivot cup which is held in frictional contact against a housing. Examples are: U.S. Pat. No. 4,696,555 entitled "Electric Remote Control Mirror Apparatus", issued to Enomoto on Sep. 29, 1987; U.S. Pat. No. 4,693,571 entitled "Support And Drive Unit For Mirror Devices", issued to Kimura on Sep. 15, 1987; U.S. Pat. No. 4,555,166 entitled "Electric Remote Control Mirror With Half-Ball Portion", issued to Enomoto on Nov. 26, 1985; and, U.S. Pat. No. 4,506,954 entitled "Motor Driven Remote Control Mirror Device With Shaft Portion Pivot Not Coincident With Shaft Axis", issued to Enomoto on Mar. 26, 1985, all of which are incorporated by reference herewithin. Nevertheless, while these patents have improved the art, the patents using pivot cups usually have a cup with a relatively small cross sectional diameter. Moreover, these pivot cups are integrated into the mirror casings.

SUMMARY OF THE INVENTION

In accordance with the present invention, the preferred embodiment of a power pack unit for use in exterior mirror assemblies for automotive vehicles is comprised of an upper housing wherein a partially spherical depression is created centrally therewithin. More specifically, the depression in this unique upper housing extends below the planar surface created by the top of the motors contained thereunder. Therefore, the pivot cup sectional diameter can become larger without taking up increased space between the lower housing and the mirror.

A further aspect of the present invention is that the pivot cup is independent from the mirror casing. This allows for serviceability of the power pack without destroying the mirror. This is also beneficial in that the pivot cup material can be different than the ultraviolet light stabilized and colored casing material.

Another aspect of the present invention is that the upper housing can be permanently attached to the lower housing when both are fastened to the mounting bracket. Furthermore, a unique spring retainer eliminates the need for a compression spring to provide friction against the pivot cup.

BRIEF DESCRIPTION OF THE DRAWINGS

Additional features of the present invention will become apparent from the following description and appended claims, taken in conjunction with the accompanying drawings.

FIG. 2 is an exploded perspective view showing the present invention power pack from FIG. 1;

FIG. 4 is a sectional view of the present invention power pack, taken from FIG. 3 along line 4—4;

FIG. 5 is also a sectional view of the present invention power pack in a pivoted position, taken from FIG. 3 along line 4—4;

FIG. 6 is a perspective view showing the retention means of the present invention power pack from FIG. 2;

DESCRIPTION OF THE PREFERRED EMBODIMENT

Figure 1:
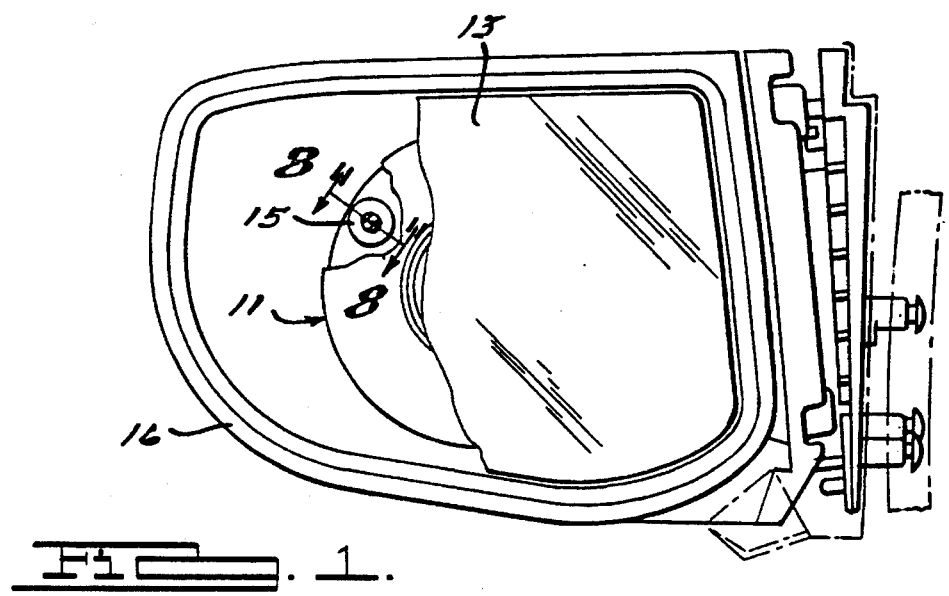
FIG. 1 is a rear elevation view showing the preferred embodiment of the present invention automotive exterior mirror assembly and power pack.
Figure 3:
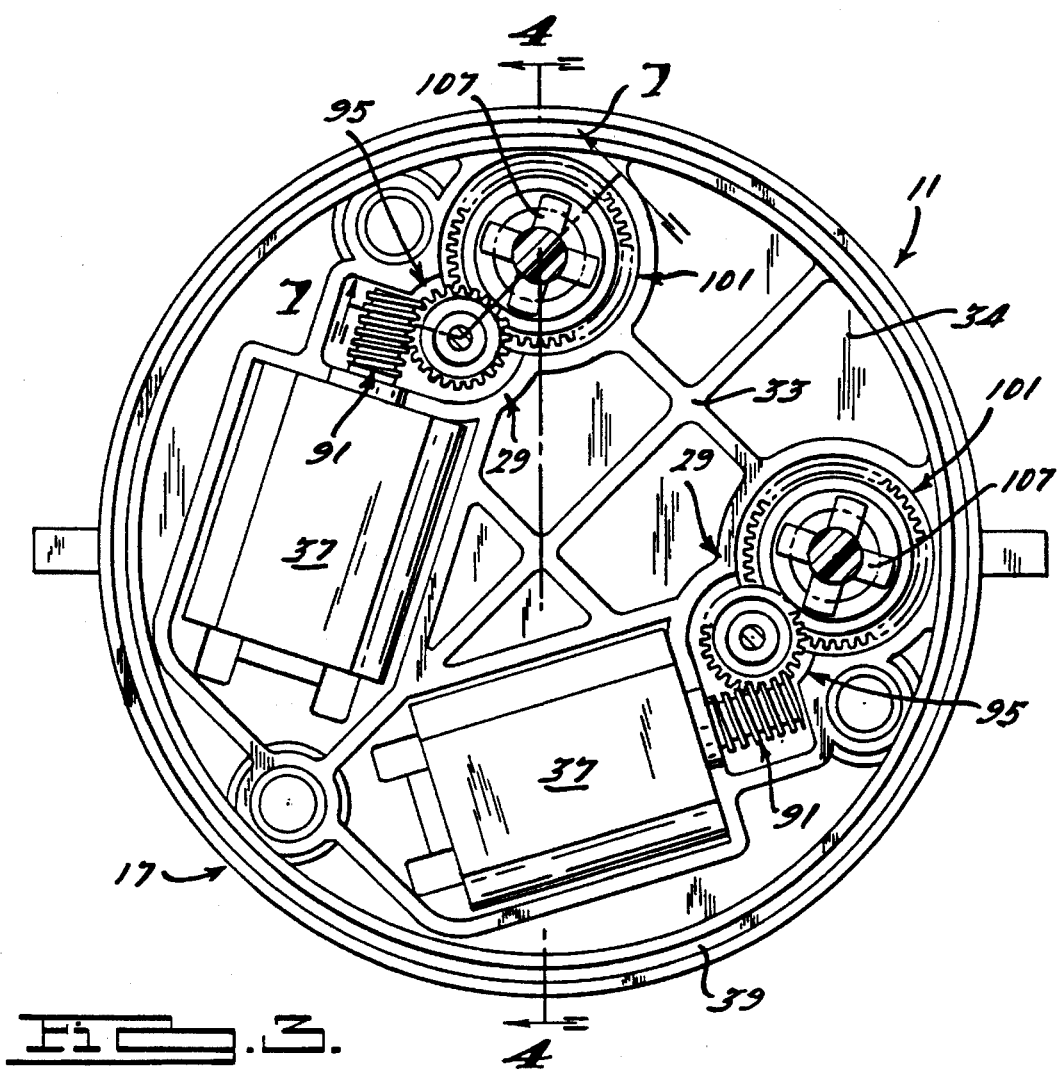
FIG. 3 is a rear elevation view showing the lower housing and drive system of the present invention power pack from FIG. 1.

The preferred embodiment of the present invention automotive exterior mirror power pack 11 serves to retain and remotely position a mirror 13. Referring to FIG. 1, the power pack 11 is attached to a mounting bracket 15, both of which are encased within an aesthetically pleasing outer shell 16.

Referring to FIGS. 2–5, power pack 11 is comprised of a lower housing 17, an upper housing 19, a boot 31, a pivot cup 21, a pivot sleeve 23, a pivot retainer 25, a spring retainer 27 and a drive means 29. Lower housing 17 is circular in shape, having a center portion 34 which is substantially flat with ribs 33 extending upwards therefrom. Center portion 34 also contains cavities 35 for retaining a pair of motors 37 and a variety of gears. Lower housing 17 has upwardly extending walls 39 around the circumference of the part.

Upper housing 19 is located adjacent to and on top of the lower housing 17. Upper housing 19 has a generally flat top surface 41 bounded circumferentially by a downward extending wall 43. Top surface 41 contains a partially spherical depression 45 centrally located therewithin. Spherical depression 45 partially protrudes below the top horizontal plane created by motors 37. A post 47 is centrally located within spherical depression 45 and is perpendicular to top surface 41. Post 47 is integrally molded within upper housing 19. Top surface 41 of upper housing 19 has two openings 49 contained therewithin. A jack screw 51 extends upwards through each opening 49, and both openings 49 and threaded portion 113 of jack screws 51 are covered by an elastomeric boot 31. This boot 31 serves to protect drive mechanism 29 from dirt and water. Boot 31 has two upwardly directed conical projections 53 with passages 55 contained in the top side of each. Each conical section 53 has an outwardly extending bottom lip 57 therearound with pair of lips 57 being connected by a generally flat section 59. Each lip 57 fits snugly over an outwardly extending flange 61 partially molded around upper housing openings 49. Upper housing 19 and lower housing 17 are injection molded from Noryl 844, which can be obtained from General Electric Plastics.

Figure 8:
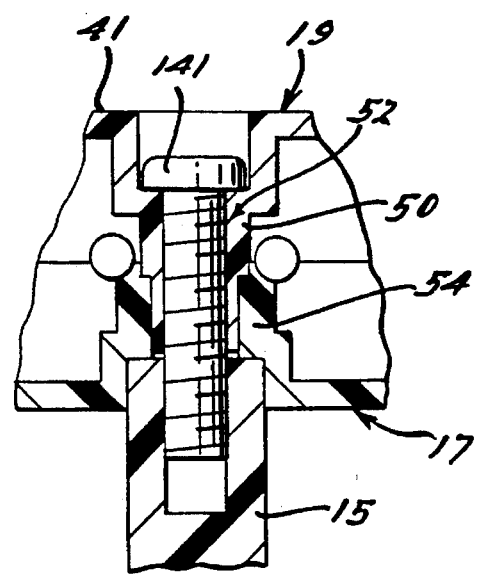
FIG. 8 is a sectional view showing a portion of the present invention power pack, taken from FIG. 1 along line 8—8.

As can best be seen in FIG. 8, upper housing 19 has three equally spaced apart compressible bosses 50 extending down below normal surface 41 of upper housing 19. A fastening bore 52 extends through each boss 50. These multiple bosses 50 serve to engage matching bosses 54 upwardly extending from central portion 34 of lower housing 17. A fastening bore 52 also extends axially through lower bosses 54. Bosses 50 are compressible toward their axial centerline for providing an interference fit within the fastening bores of lower bosses 54. The interference fit of compressible bosses 50 into lower bosses 54 provides a temporary attachment between upper and lower housings, respectively 19 and 17. Once the entire power pack 11 is assembled, screws 141 can be driven through bores 52 and directly into mounting bracket 15, thus upper housing 19 and lower housing 17 are permanently and simultaneously attached when the entire assembly is affixed to mounting bracket 15.

Referring again to FIGS. 2–5, pivot cup 21 is proximately adjacent to the concave side of upper housing spherical depression 45. Pivot cup 21 has a central partially spherical portion 63 bordered by a generally flat outer rim 65. Within the center of spherical portion 63 there exists a generally square aperture 67 with rounded corners. When pivot cup 21 is assembled onto upper housing 19, upper housing post 47 extends upward through square aperture 67, and edges 69 of square aperture 67 limit the X-Y pivotal movement. A groove 71 is formed in the concave side of pivot cup spherical portion 63 and runs latitudinally from rim 65 to square aperture edge 69. At two positions on the backside of pivot cup rim 65 there are a set of cavities 75 which serve to pivotally retain top portion 77 of each jack screw 51. The inside diameter of pivot cup spherical portion 62 is approximately 37 millimeters, thereby placing pivot point 79 at the intersection of pivot axis 73 and the backside of mirror casing 81. The mirror casing has a central portion which is substantially flat with one or more locking ribs 81A extending from the backside. The flat rim 65 of pivot cup 21 is removably retained by the one or more locking ribs 81A. The mirror casing 81 is bordered by a lip 81B which extends outwardly therefrom and surrounds the edges of the mirror 13. The large size of pivot cup spherical portion 62 and the position of pivot point 79 significantly reduces optical distortion caused by vibration. Pivot cup 21 is also injection molded from Noryl 844. Boot 31 is injection molded from a Neoprene synthetic elastomer.

Pivot sleeve 23 is located on top of spherical portion 63 of pivot cup 21. Pivot sleeve 23 is partially spherically shaped on its top and bottom surfaces, respectively 84 and 86, with a substantially square orifice 82 cut centrally therein. Pivot sleeve 23 has a latitudinal rib 74 extending along bottom surface 86 thereof such that rib 74 fits within groove 71 of pivot cup 21. Rib 74 and groove 71 act coincidentally to index the pivotal motion along either the X or Y axis. A latitudinal groove 88 extends along top surface 84 of pivot sleeve 23 from a peripheral edge 90 to central square orifice 82. This groove 88 is perpendicular to rib 74. Pivot sleeve 23 is injection molded from Nylon 6/6.

Pivot retainer 25 is forcibly compressed upon top surface 84 of pivot sleeve 23. Pivot retainer 25 has a lower surface 92 which is partially spherical with a void located centrally therewithin. A rib 77 extends latitudinally along lower surface 92 and fits within groove 88 of pivot sleeve 23. This rib 77 and groove 88 cooperatively act to maintain pivotal movement along the axis perpendicular to that of rib 74 and groove 71. Moreover, top side 94 of pivot retainer 25 has structural ribbing. Pivot retainer 25 is injection molded from Nylon R400G, which can be obtained from Monsanto Corporation.

A spring retainer 27 forcibly compresses pivot retainer 25 against pivot sleeve 23, which in turn, frictionally traps pivot cup 21 between pivot sleeve 23 and upper housing 19. This downward pressure supplies pivotal control and vibration dampening for pivot cup 21. As can best be observed in FIG. 6, spring retainer 27 itself comprises a central ring portion 79 with an opening 81 centrally located therewithin, six relief slots 83 radiating outward from the central opening 81, and six S-shaped spring arms 85 radiating outward and down below central ring portion 79. Inside edge 87 of central ring 79 supplies the locking action of spring retainer 27 upon the end of upper housing post 47. The downwardly pressing spring arms 85 supply the compressive force against top surface 94 of pivot retainer 25. Spring retainer 27 is stamped and formed from spring steel.

Figure 7:
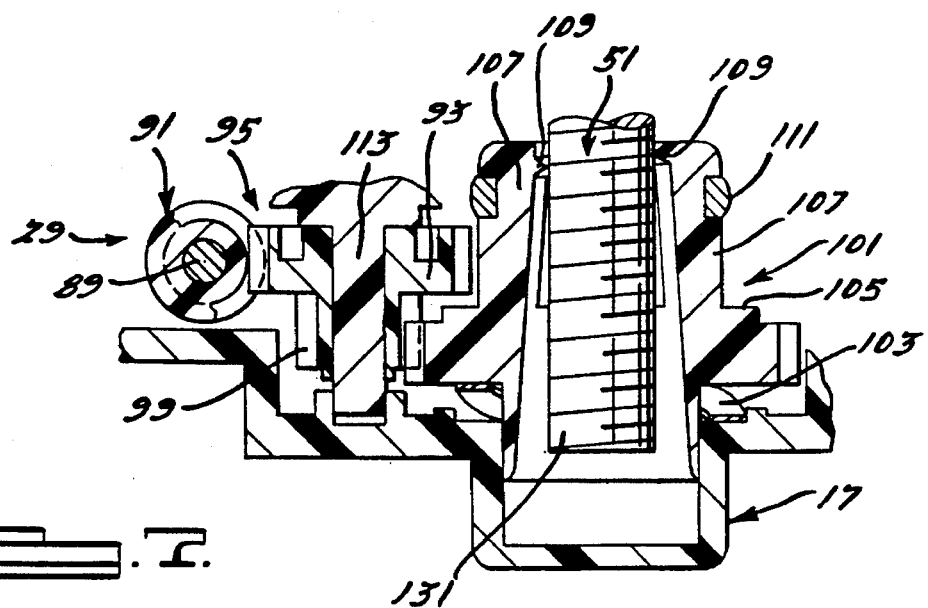
FIG. 7 is a sectional view showing the drive system of the present invention power pack, taken from FIG. 3 along line 7—7.

Referring to FIGS. 4, 5 and 7, drive means 29 acts to pivotally move the pivot cup 21 about its X and Y axes. Drive means 29 is retained between the upper and lower housings, respectively 19 and 17. The pair of motors 37 are spaced so that their rearward ends are facing toward one another with their respective drive shafts 89 angularly facing away from each other. These motors 37 are of a standard type known to one skilled in the art. Upon each drive shaft 89, a worm gear 91 is press fit thereupon. Each worm gear 91 is injection molded from Monsanto Vydyne G.P. Nylon and has a diametrical pitch of 64, a pressure angle of 20°, a lead angle of 5°, a right hand helix, a pitch diameter of 4.5974 millimeters, an outside diameter of 5.3899 millimeters. In turn, each worm gear 91 engages upper teeth 93 of an idler gear 95. Each idler gear 95 has 24 upper teeth 93, a 64 diametral pitch, a pressure angle of 20°, a pitch diameter of 9.525 millimeters, an outside diameter of 10.319 millimeters, and a 5° right hand helix. Each idler gear 95 is axially mounted upon a pin 113 downwardly extending from upper housing 19, thereby maintaining constant angled engagement with each worm gear 91. This reduces the gearing noise. A lower teeth set 99 is axially beneath upper teeth 93. There are 12 lower teeth 99, each having a diametral pitch of 64, a pressure angle of 20°, a pitch diameter of 4.763 millimeters, an outside diameter of 5.556 millimeters and a 5° right hand helix angle. Furthermore, these lower teeth 99 engage and drive a screw gear 101. Each screw gear 101 has 44 teeth with a diametral pitch of 64, a pressure angle of 20°, a pitch diameter of 17.462 millimeters, an outside diameter of 18.254, and a 5° left hand helix angle, and is made from Vydyne G.P. Nylon. Each screw gear 101 sits upon a spring washer 103 which provides upward pressure against screw gear 101. Each screw gear 101 has a generally flat upper surface 105 with a plurality of fingers 107 extending upwards therefrom. These fingers 107 have inwardly facing points 109 and an O-ring 111 compresses each finger 107 inwards for engagement with a jack screw 51. Each jack screw has a lower threaded portion 131 having M6 by 1.0 millimeter threads. The top portion 77 of each jack screw 51 protrudes up through boot passages 55 and pivotally connects with each pivot cup cavity 75. Each jack screw 51 is also injection molded from Vydyne G.P. Nylon. Jack screw drives of this general type are shown: in U.S. Pat. No. 4,940,321 entitled "Drive Unit For Electrically Driven Remote-Controlled Mirror", issued to Yoshida on Jul. 10, 1990; in U.S. Pat. No. 4,881,418 entitled "Pivotable Screw Jack Drive", issued to Fimeri on Nov. 21, 1989; and in U.S. Pat. No. 4,693,571 entitled "Support And Drive Unit For Mirror Devices", issued to Kimura on Sep. 15, 1987, all of which are incorporated by reference herewithin.

It will be appreciated that the power pack of the present invention represents a significant improvement for automotive exterior mirror assemblies. The central depression in the upper housing and the specific motor positioning within the lower housing allow for a large diameter pivot cup to be used in a thin cross sectional mirror package. This will significantly reduce the vibrational problems which lead to optical distortion. Furthermore, the pivot cup is independent from the mirror casing thereby allowing easier serviceability and more cost effective material selections. The unique spring retainer also allows for adequate frictional dampening without requiring a separate compression spring and spring retainer. Finally, the ability to simultaneously attach the upper and lower housings, while assembling the power pack to the mounting bracket, provides a more cost effective assembly technique.

While a number of specific embodiments of this power pack have been disclosed, it will be appreciated that various modifications may be made without departing from the present invention. For example, while a spring retention means has been shown, a conventional spring retainer and compression spring can be used without departing from the present invention. Furthermore, it will be appreciated that other drive means may be employed without departing from the invention, even though a specific worm gear, idler gear, screw gear and jack screw, drive means have been disclosed. While various materials have been disclosed in an exemplary fashion, various other materials may of course be employed. It is intended by the following claims to cover these and any other departures from these disclosed embodiments which fall within the true spirit of this invention.

The invention claimed is:

1. A power pack for an automotive exterior mirror assembly comprising:

a pivot cup having a partially spherical center portion with a concave top surface;

an upper housing having a centrally located post protruding upward therefrom, said upper housing having a partially spherical depression partially extending below the top plane of a motor contained within said upper housing, said post of said upper housing extending through an aperture within the center of said pivot cup's partially spherical portion;

a pivot sleeve having a partially spherical shape, said pivot sleeve being engaged with said concave top surface of said pivot cup's central partially spherical portion, said pivot sleeve having an orifice in the center thereof such that said upper housing post extends therethrough; and said pivot cup sliding between said pivot sleeve and said upper housing.

2. The power pack of claim 1 further comprising:

a second motor;

each of said motors having a drive shaft extending therefrom;

a lower housing holding said motors, rearward ends of said motors being angled toward each other and said drive shafts being displaced at an angle away from one another; and said upper housing having said partially spherical depression centrally located therewithin, said upper housing partially spherical depression partially extends below the top plane created by said motors and said upper housing spherical depression protruding downwards into the space between said motors.

3. The power pack of claim 2 further comprising:

a pair of worm gears, each being attached to said drive shafts by an interference fit, said drive shafts supplying rotational movement to each of said pair of worm gears;

a pair of idler gears each having two different teeth sets axially spaced thereupon, said pair of idler gears each being axially held upon said upper housing by a pin extending downward therefrom, said pair of worm gears supplying rotational movement to each of said pair of idler gears;

a pair of screw gears each having geared teeth surrounding a lower circular portion thereof, each of said pair of screw gears having a plurality of fingers extending upwards therefrom, said plurality of fingers each having internally directed points thereupon, said pair of screw gears being located in a pair of cavities within said lower housing, each of said pair of idler gears supplying rotational movement to each of said pair of screw gears;

a pair of O-rings placed around said plurality of fingers on each of said pair of screw gears for maintaining inward pressure of said plurality of fingers;

a pair of jack screws each being externally threaded, the external threads of each providing an engagement surface thereupon with said plurality of fingers of said screw gear, said plurality of fingers supplying rotational movement to each of said pair of jack screws, said pair of jack screws each having a generally spherical top with a pin extending centrally therefrom, said pin being generally affixed perpendicular to each of said pair of jackscrews' axes; and a rim of said pivot cup having a pair of pivoting and attachment cavities thereupon, whereby said pair of jack screws pivotally drive said pivot cup.

4. The power pack of claim 3 wherein:

said upper housing has a pair of openings, each of said pair of openings has a wall peripherally extending upward therefrom, said walls have outwardly extending partial flanges thereupon;

said pair of jack screws each protrudes upward through said pair of openings in said upper housing;

a boot has a pair of conical shapes extending upwards therefrom, each of said pair of conical shapes has passages in the top thereof, said pair of conical shapes each a lip extending generally perpendicular therebelow, said lips are connected by a substantially flat central portion; and said boot is retained to said upper housing through a fit of said conical lip upon said upper housing opening flanges, each of said pair of jack screws extends through each of said pair of passages within said boot.

5. The power pack of claim 1 further comprising:

a pivot retainer having a partially spherically shaped lower surface, said pivot retainer being forcibly engaged against the top of said pivot sleeve, said pivot retainer having a void in the center thereof such that said upper housing post extends therethrough;

a retainer attached to the top of said upper housing post, said retainer forcibly retaining said pivot retainer, said pivot sleeve, and said pivot cup against said upper housing; and a lower housing having a substantially flat central surface with ribs upwardly extending therefrom, said lower housing central surface being bordered by a raised side wall extending around the circumference thereof, said lower housing having cavities for locating said motor therewithin, said lower housing being retained to said upper housing by means for attachment.

6. The power pack of claim 5 wherein said retainer comprises a central ring portion with a central opening, said central ring portion has a plurality of relief slots radiating outwards from the central ring portion's central opening, said central ring portion has at least five outwardly and downwardly radiating S-shaped spring arms.

7. The power pack of claim 1 wherein said pivot cup partially spherical portion has an inside diameter of at least 35 millimeters.

8. The power pack of claim 1 further comprising:

a mirror;

a mirror casing having a central portion which is substantially flat without voids therethrough, said central portion bordered by an outwardly extending lip; and said pivot cup being an independent member from said mirror casing, whereby said mirror casing and said mirror retained thereupon can be disassembled from said pivot cup for repair.

9. A power pack for an automotive exterior mirror assembly comprising:

a motor;

a pivot cup having a partially spherical center portion;

a housing having a centrally located post protruding upward therefrom, said housing having a partially spherical depression partially extending below a top plane of said motor contained within said housing, said post of said housing extending through an aperture within a center of said pivot cup's partially spherical portion; and driving means drivably coupled to said motor for operably pivoting said pivot cup.

10. The power pack of claim 9 further comprising:

a second motor;

each of said motors having a drive shaft extending therefrom;

said housing includes a lower housing and an upper housing, said lower housing holding said motors, rearward ends of said motors being angled toward each other and said drive shafts being displaced at an angle away from one another; and said upper housing having said partially spherical depression centrally located therewithin, said upper housing partially spherical depression partially extending below the top plane created by said motors and protruding downwards into a space between said motors.

11. The power pack of claim 10 wherein said driving means comprises:

a pair of worm gears, each being attached to said drive shafts by an interference fit, said drive shafts supplying rotational movement to each of said pair of worm gears;

a pair of idler gears each having two different teeth sets axially spaced thereupon, said pair of idler gears each being axially held upon said upper housing by a pin extending downward therefrom, said pair of worm gears supplying rotational movement to each of said pair of idler gears;

a pair of screw gears each having geared teeth surrounding a lower circular portion thereof, each of said pair of screw gears having a plurality of fingers extending upwards therefrom, said plurality of fingers each having internally directed points thereupon, said pair of screw gears being located in a pair of cavities within said lower housing, each of said pair of idler gears supplying rotational movement to each of said pair of screw gears;

a pair of O-rings placed around said plurality of fingers on each of said pair of screw gears for maintaining inward pressure of said plurality of fingers;

a pair of jack screws each being externally threaded, the external threads of each providing an engagement surface thereupon with said plurality of fingers of said screw gear, said plurality of fingers supplying rotational movement to each of said pair of jack screws, said pair of jack screws each having a generally spherical top with a pin extending centrally therefrom, said pin being generally affixed perpendicular to each of said pair of jackscrews' axes; and said pivot cup rim having a pair of pivoting and attachment cavities thereupon, whereby said pair of jack screws provides the pivotal drive means for said pivot cup.

12. The power pack of claim 9 wherein said pivot cup partially spherical portion has an inside diameter of at least 35 millimeters.

13. The power pack of claim 9 further comprising:

a mirror;

a mirror casing having a central portion which is substantially flat without voids therethrough, said central portion bordered by an outwardly extending lip; and said pivot cup is an independent member from said mirror casing, whereby said mirror casing and said mirror retained thereupon can be disassembled from said pivot cup for repair.

14. A power pack for an automotive exterior mirror assembly comprising:

a pair of motors;

a pivot cup having a partially spherical center portion with a concave top surface;

an upper housing having a partially spherical depression partially extending below a top plane of said pair of motors contained within said upper housing;

a pivot sleeve having a partially spherical shape, said pivot sleeve being engaged with a said concave top surface of said pivot cup's central partially spherical portion;

said pivot cup sliding between said pivot sleeve and said upper housing; and a lower housing holding said pair of motors, rearward ends of said pair of motors being angled toward each other and drive shafts extending from each being displaced at an angle away from one another with said partially spherical depression protruding downwardly into a space therebetween.

15. The power pack of claim 14 further comprising:

a pair of worm gears, each being attached to said drive shafts by an interference fit, said drive shafts supplying rotational movement to each of said pair of worm gears;

a pair of idler gears each having two different teeth sets axially spaced thereupon, said pair of idler gears each being axially held upon said upper housing by a pin extending downward therefrom, said pair of worm gears supplying rotational movement to each of said pair of idler gears;

a pair of screw gears each having geared teeth surrounding a lower circular portion thereof, each of said pair of screw gears having a plurality of fingers extending upwards therefrom, said plurality of fingers each having internally directed points thereupon, said pair of screw gears being located in a pair of cavities within said lower housing, each of said pair of idler gears supplying rotational movement to each of said pair of screw gears;

a pair of O-rings placed around said plurality of fingers on each of said pair of screw gears for maintaining inward pressure of said plurality of fingers;

a pair of jack screws each being externally threaded, the external threads of each providing an engagement surface thereupon with said plurality of fingers of said screw gear, said plurality of fingers supplying rotational movement to each of said pair of jack screws, said pair of jack screws each having a generally spherical top with a pin extending centrally therefrom, said pin being generally affixed perpendicular to each of said pair of jackscrews' axes; and a rim of said pivot cup having a pair of pivoting and attachment cavities thereupon, whereby said pair of jack screws pivotally drives said pivot cup.

16. The power pack of claim 15 wherein:

said upper housing has a pair of openings, each of said pair of openings has a wall peripherally extending upward therefrom, said walls have outwardly extending partial flanges thereupon;

said pair of jack screws each protrudes upward through said pair of openings in said upper housing;

a boot has a pair of conical shapes extending upwards therefrom, each of said pair of conical shapes has passages in the top thereof, said pair of conical shapes each a lip extending generally perpendicular therebelow, said lips are connected by a substantially flat central portion; and said boot is retained to said upper housing through a fit of said conical lip upon said upper housing opening flanges, each of said pair of jack screws extends through each of said pair of passages within said boot.

17. The power pack of claim 14 wherein said pivot cup partially spherical portion has an inside diameter of at least 35 millimeters.

18. The power pack of claim 17 further comprising:

a mirror;

a mirror casing having a central portion which is substantially flat without voids therethrough, said central portion bordered by am outwardly extending lip; and said pivot cup is an independent member from said mirror casing, whereby said mirror casing and said mirror retained thereupon can be disassembled from said pivot cup for repair.

\* \* \* \* \*